UNITED STATES PATENT OFFICE.

ALEXANDER MACKEY PARKER, OF LONDON, ENGLAND.

PROCESS OF MAKING GERM EXTRACT.

SPECIFICATION forming part of Letters Patent No. 624,675, dated May 9, 1899.

Application filed May 11, 1896. Serial No. 591,146. (No specimens.)

*To all whom it may concern:*

Be it known that I, ALEXANDER MACKEY PARKER, a subject of the Queen of Great Britain, residing at London, England, have invented new and useful Improvements in the Manufacture of Germ Extract, (for which Letters Patent have been granted to me in Great Britain, No. 14,631, dated August 1, 1895;) and I do hereby declare that the following is a full, clear, and exact description of the invention, which will enable others skilled in the art to which it appertains to make and use the same.

My invention relates to improvements in the treatment of the germ of wheat and in the making of an extract therefrom chiefly for use in the manufacture of various articles of food, such as bread and biscuits, but also applicable for use in some kinds of beverages, such as aerated beverages.

In carrying out my invention I take about one hundred pounds weight of germ of wheat and place it in a suitable vessel, adding thereto about forty gallons of water heated to about 100° Fahrenheit. I then stir in about three hundred grains of bicarbonate of potash. I allow the whole to digest for about one and one-half hours at 100° Fahrenheit, keeping the heat steady during the process. I then strain the mixture and pour over the residue about fifteen gallons of water at 100° Fahrenheit to remove therefrom such portion of the germ extract as may be left in the mass and add the same to the liquor already drawn off. I place the liquor thus obtained in a settling-vat, keeping it at a low temperature, having previously added about one pound of a suitable preservative mixture. I allow the liquor to settle for from eighteen hours to twenty-four hours, according to the temperature, and then draw off the clear liquor, rejecting the sediment. I then place the clear liquor in an evaporating-pan, maintaining the heat at about 130° Fahrenheit, until it is concentrated to a suitable density, and after filtering it I add about five pounds of the finest extract of malt and stir well together. The liquid extract thus prepared is then ready to be filled into tins.

Where the extract is required in the form of a paste or jelly, its bulk is further reduced by evaporation, and a gelatinous or jellying mixture is added and the extract poured into molds, tins, or other vessels to bring it to the consistency of a stiff jelly. It may then be removed from the mold and sprinkled with rice-flour to prevent adhesion, or it may be put up in any other suitable form or vessel.

Having now particularly described and ascertained the nature of my said invention and in what manner the same is to be performed, I declare that what I claim is—

1. The herein-described process of making germ extract which consists in heating wheat-germ with water containing bicarbonate of potash, removing the solid matter, and condensing the resulting liquid, substantially as described.

2. The herein-described process of making germ extract which consists in heating wheat-germ with water containing bicarbonate of potash, removing the solid matter, condensing the resulting liquid, and adding malt extract, substantially as described.

3. The described process for the manufacture of germ extract, such process consisting in heating germ of wheat with water, adding bicarbonate of potash, straining the mixture, adding a suitable preservative to the liquor and then allowing the latter to settle, evaporating the same, filtering, and adding extract of malt, substantially as described.

4. The herein-described process of making germ extract which consists in heating wheat-germ with water containing bicarbonate of potash, removing the solid matter, condensing the resulting liquid, adding malt extract, again condensing the liquid, and adding a gelatinous material to solidify it, substantially as described.

ALEXANDER MACKEY PARKER.

Witnesses:
G. F. REDFERN,
JOHN E. BOUSFIELD.